(12) United States Patent
Shimabara

(10) Patent No.: US 6,360,168 B1
(45) Date of Patent: Mar. 19, 2002

(54) NAVIGATION APPARATUS

(75) Inventor: Daisuke Shimabara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/657,713

(22) Filed: Sep. 8, 2000

(30) Foreign Application Priority Data

Sep. 14, 1999 (JP) .......................................... 11-260538

(51) Int. Cl.$^7$ ............................................. G01C 21/00
(52) U.S. Cl. ..................... 701/211; 701/200; 340/990; 340/995; 345/427; 345/853
(58) Field of Search ............................... 701/201, 208, 701/209, 210, 211; 340/990, 995; 345/427, 852

(56) References Cited

U.S. PATENT DOCUMENTS

| | | | | |
|---|---|---|---|---|
| 5,448,696 A | * | 9/1995 | Shimada et al. ............. | 345/853 |
| 5,638,279 A | * | 6/1997 | Kishi et al. .................. | 701/200 |
| 5,917,436 A | | 6/1999 | Endo et al. | |
| 5,936,553 A | | 8/1999 | Kabel ......................... | 340/995 |
| 5,974,876 A | | 11/1999 | Hijikata et al. ............ | 73/178 R |
| 5,983,158 A | * | 11/1999 | Suzuki et al. ................ | 701/209 |
| 5,999,879 A | * | 12/1999 | Yano ........................... | 701/208 |
| 6,035,253 A | * | 3/2000 | Hayashi et al. .............. | 701/211 |
| 6,144,318 A | * | 11/2000 | Hayashi et al. .............. | 340/995 |
| 6,182,010 B1 | * | 1/2001 | Berstis ......................... | 701/211 |

\* cited by examiner

Primary Examiner—William A. Cuchlinski, Jr.
Assistant Examiner—Marthe Marc-Coleman
(74) Attorney, Agent, or Firm—Brinks Hofer Gilson & Lione

(57) ABSTRACT

A car navigation apparatus includes a map-image creating device for creating a map image observed ahead, in the traveling direction, of a vehicle from a predetermined position of a viewpoint, a guiding-image creating device for creating a guiding image including information on a predetermined intersection included in the map image, an auxiliary-image creating device for creating an auxiliary image showing which intersection included in the map image relates to the guiding image, and an image display device for synthesizing the guiding image created by the guiding-image creating device and the auxiliary image created by the auxiliary-image creating device on the map image created by the map image creating device and for displaying the synthesized image.

32 Claims, 11 Drawing Sheets

MAP DATA

FIG. 5A

NODE TABLE

| #0 NODE RECORD |
|---|
| #1 NODE RECORD |
| #2 NODE RECORD |
| ⋮ |

FIG. 5B

CONNECTION NODE TABLE

| NORMALIZED LONGITUDE OF NODE |
|---|
| NORMALIZED LATITUDE OF NODE |
| ATTRIBUTE FLAG OF NODE |
| NUMBER OF CONNECTING NODES |
| NUMBER OF TRAFFIC CONTROLS |
| ⋮ |
| #0 CONNECTION NODE RECORD (LINK NUMBER) |
| #1 CONNECTION NODE RECORD (LINK NUMBER) |
| ⋮ |
| #0 TRAFFIC CONTROL RECORD |
| #1 TRAFFIC CONTROL RECORD |
| ⋮ |
| NEIGHBORING NODE RECORD |
| STORAGE LOCATION OF INTERSECTION RECORD |
| SIZE OF INTERSECTION RECORD |

FIG. 5C

| LINK TABLE |
|---|
| #0 LINK RECORD |
| #1 LINK RECORD |
| #1 LINK RECORD |
| ⋮ |

| LINK RECORD |
|---|
| LINK ID |
| NODE NUMBER 1 |
| NODE NUMBER 2 |
| DISTANCE |
| COST (FROM NODE 1 TO NODE 2) |
| COST (FROM NODE 2 TO NODE 1) |
| ROAD ATTRIBUTE FLAG 1 |
| ROAD ATTRIBUTE FLAG 2 |
| ROAD ATTRIBUTE FLAG 3 |
| ROAD ATTRIBUTE FLAG 4 |
| ROAD TYPE FLAG |
| ROUTE NUMBER |
| ⋮ |

FIG. 6

INTERSECTION UNIT

| UNIT ID CODE |
| --- |
| #0 INTERSECTION RECORD |
| #0 INTERSECTION DIRECTION INFORMATION RECORD |
| #0 INTERSECTION LANE INFORMATION RECORD |
| #0 INTERSECTION DRAWING RECORD |
| #1 INTERSECTION RECORD |
| #1 INTERSECTION DIRECTION INFORMATION RECORD |
| #1 INTERSECTION LANE INFORMATION RECORD |
| #1 INTERSECTION DRAWING RECORD |
| ⋮ |

FIG. 7

INTERSECTION RECORD

| |
|---|
| INTERSECTION INFORMATION FLAG |
| NUMBER OF CROSSING ROADS |
| STORAGE LOCATION OF CORRESPONDING INTERSECTION DRAWING RECORD |
| DISPLAY COORDINATE OF INTERSECTION NAME · NORMALIZED LONGITUDE |
| DISPLAY COORDINATE OF INTERSECTION NAME · NORMALIZED LATITUDE |
| INTERSECTION NAME CHARACTER STRING |
| #0 LINK ID |
| #0 STORAGE LOCATION OF INTERSECTION INFORMATION RECORD CORRESPONDING TO THIS LINK |
| ⋮ |

NAVIGATION APPARATUS

BACKGROUND OF THE INVENTION

1. Field of the Invention

The present invention relates to a navigation apparatus displaying intersection information and the like which is superimposed on a map image in the vicinity of a user's vehicle.

2. Description of the Related Art

Generally, a car navigation apparatus detects the current position of a vehicle, reads map data in the vicinity thereof from a data storage medium such as CD (Compact Disc) or DVD (Digital Versatile Disc), and displays it on a screen. A vehicle position mark representing the position of the vehicle is displayed in the middle of the screen. In accordance with the travel of the vehicle, the map data in the neighborhood is scrolled while centered on this vehicle position mark, so that map information in the vicinity of the vehicle is always shown. When an intersection approaches, intersection guiding images of traffic signals, traffic signs (one-way traffic sign and the like), a route number, the number of lanes, the intersection name, and the like are shown superimposed one after another.

Recently, it has become common to use a map image as seen in the traveling direction of the vehicle using a bird's eye view, in which the position of viewing is set at a predetermined position above the vehicle. When the map image is shown using a bird's eye view in this manner, compared to a case in which the map image is shown in a plan view (in a two-dimensional manner), since an image is shown which is more similar to the view actually observed by a driver, there is an advantage in that the driver can easily recognize the traveling direction of the vehicle.

When a map image in the vicinity of a vehicle is shown using a bird's eye view in the above-described manner, there is a disadvantage in that the perspective of the displayed map image is hard to recognize. In particular, when the displayed map image includes a plurality of intersections and guiding images which represent information (traffic lights, the presence or absence of traffic control, lane information, and the like) for each intersection, all displayed at the same time, it is difficult to recognize the corresponding relationship between the guiding images and the intersections as to which guiding images belong to which intersections.

SUMMARY OF THE INVENTION

The present invention is made in view of such problems. The object thereof is to provide a navigation apparatus which enables the position on the map corresponding to each of various guiding images to be easily recognized.

To this end, according to a first aspect of the present invention, there is provided a car navigation apparatus including a map-image creating device for creating a map image observed ahead, in the traveling direction, of a vehicle from a predetermined position of a viewpoint, a guiding-image creating device for creating a guiding image including information on a predetermined intersection included in the map image, an auxiliary-image creating device for creating an auxiliary image showing which intersection included in the map image relates to the guiding image, and an image display device for synthesizing the guiding image created by the guiding-image creating device and the auxiliary image created by the auxiliary-image creating device on the map image created by the map image creating device and for displaying the synthesized image.

Since the auxiliary image makes clear the corresponding relationships between the guiding images and the intersections, a user such as the driver of the vehicle can easily recognize the location on the map image corresponding to a guiding image.

In a navigation apparatus, the guiding image may show information on intersections within a predetermined distance from the position of the vehicle.

In the navigation apparatus, the auxiliary image may include a leader line extending from a predetermined position in the intersection to the guiding image.

In the navigation apparatus, the guiding image may include one of a route number, lane information, and an intersection name.

In the navigation apparatus, the guiding-image creating device may set the display area or the display color of the guiding image in a variable manner in accordance with the distance between a corresponding intersection and the position of the vehicle.

Since the guiding images corresponding to an intersection in the vicinity of the position of the vehicle are more important, by varying the area or the display color of these guiding images so that the guiding images appears more noticeable the user can positively recognize guiding information on the highly important intersection at a glance.

In the navigation apparatus, preferably, the map image created by the map-image creating device includes a region corresponding to the sky, and the image display device displays guiding images superimposed one after another in the region corresponding to the sky in the map image. Generally, since information on roads, neighboring facilities, and the like are important in a map image, by displaying the guiding information superimposed one after another in the region corresponding to the sky, information on the roads and the like, which is very important, can be prevented from being visually blocked and a wasteful region of the display screen can effectively be used.

According to a second aspect of the present invention, a navigation apparatus includes a map-image creating device for creating map image data in which a building is displayed in a three-dimensional manner so as to look like that which a user observes ahead, in the traveling direction, of a vehicle from a predetermined position of a viewpoint, a guiding-image creating device for creating a guiding image including information on a predetermined intersection included in the map image, an auxiliary-image creating device for creating an auxiliary image showing which intersection included in the map image relates to the guiding image, and an image display device for synthesizing the guiding image created by the guiding-image creating device and the auxiliary image created by the auxiliary-image creating device on the map image created by the map image creating device and for displaying the synthesized image.

According to a third aspect of the present invention, a navigation apparatus includes a map-image creating device for creating a map image observed ahead, in the traveling direction, of a vehicle from a predetermined position of a viewpoint, a guiding-image creating device for, when a guiding route is set, creating a guiding image including information on intersections along the guiding route, an auxiliary-image creating device for creating an auxiliary image showing which intersection included in the map image relates to the guiding image, and an image display device for synthesizing the guiding image created by the guiding-image creating device and the auxiliary image created by the auxiliary-image creating device on the map image created by the map image creating device and for displaying the synthesized image.

When a guiding route is set on the map image, preferably, the above-described guiding-image creating device creates the guiding images corresponding to each of the intersections along the guiding route. When the guiding route is set, since it is assumed that the user travels along this guiding route, by causing the guiding images corresponding to the intersections along this guiding route to be displayed with priority, the display of unnecessary guiding images is omitted and good visibility can be obtained.

Further objects, features, and advantages of the present invention will be apparent from the following description of the preferred embodiments with reference to the attached drawings.

BRIEF DESCRIPTION OF THE DRAWINGS

FIGS. 5A to 5C are diagrams showing the detailed contents of various tables in the road unit;

FIG. 6 is a diagram showing the detailed contents of an intersection unit;

FIG. 7 is a diagram showing the detailed contents of an intersection record;

DESCRIPTION OF THE PREFERRED EMBODIMENT

Hereinafter, a navigation apparatus according to one embodiment of the present invention is described with reference to the drawings.

Figure 1:
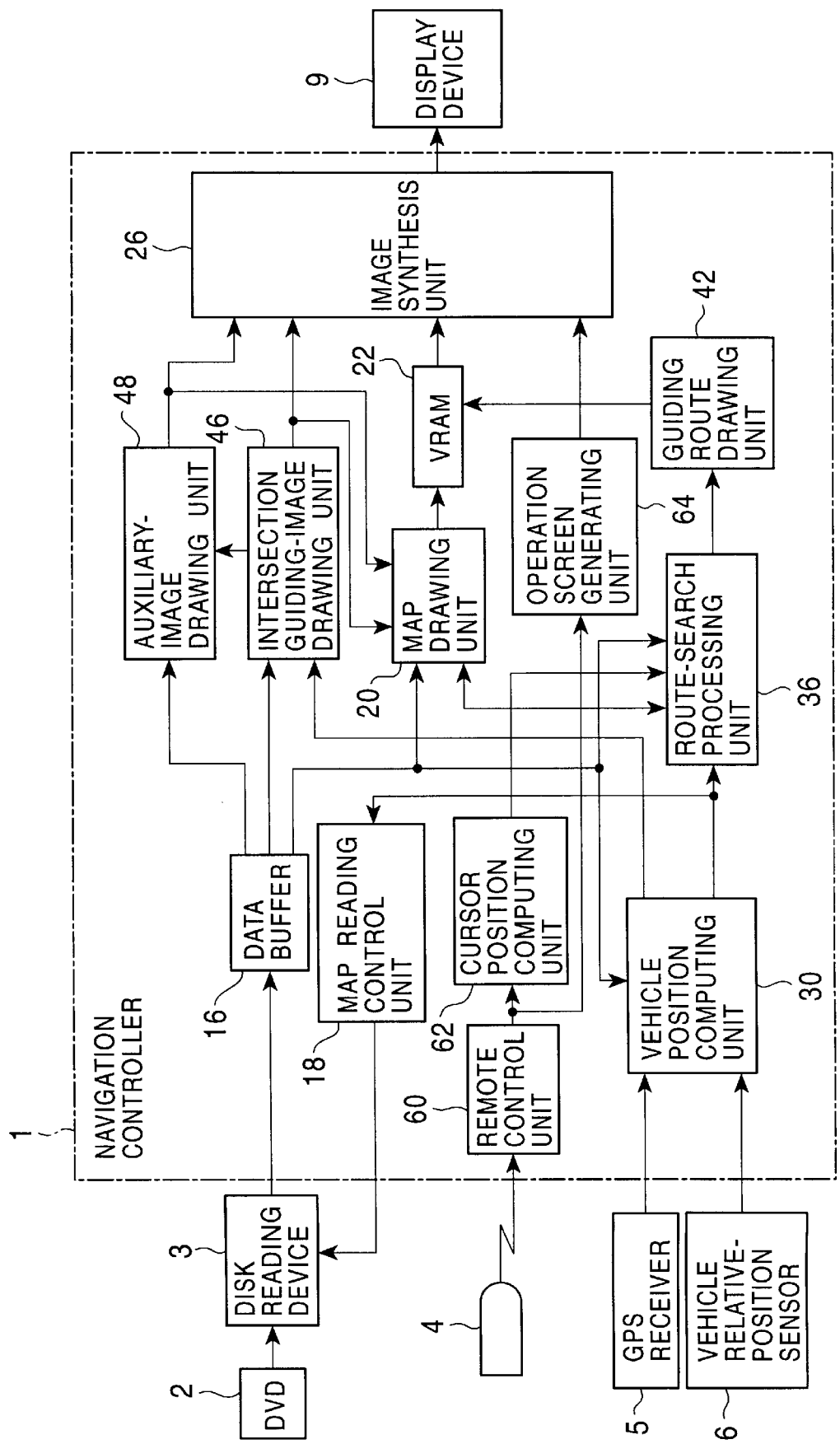
FIG. 1 is a diagram showing the overall construction of a car navigation apparatus according to one embodiment of the invention.

FIG. 1 is a diagram showing the overall construction of the car navigation apparatus according to one embodiment of the present invention. The navigation apparatus shown in FIG. 1 is provided with a navigation controller 1 for controlling the entirety of the apparatus, a DVD 2 for storing various map data which is required for map display, route searching, and the like, a disk reading device 3 for reading the map data stored in this DVD 2, a remote control unit 4 which is an operation unit for having a user input various instructions, a GPS receiver 5 and a vehicle relative-position sensor 6 for detecting the position and the bearing of a user's vehicle, and a display device 9 for displaying a map image, with information of intersections and the like superimposed thereon.

The above-described disk reading device 3 has one or more DVDs 2 mountable therein and reads the map data from any of the DVDs 2 under control of the navigation controller 1. The mounted disks are not necessarily DVDs and may be CDs. Furthermore, both DVDs and CDs are selectively mountable in the disk reading device 3.

The remote control unit 4 is provided with various operation keys such as a search key for inputting a route-search instruction, a route-guidance mode key used for setting a route-guidance mode, a destination input key, a right-left/up-down cursor key, a map scale-down/scale-up key, and a setting key for confirming an item at the cursor position on the displayed screen. The remote control unit 4 transmits, to the navigation controller 1, an infrared signal in accordance With the key operation state.

The GPS receiver 5 receives electromagnetic waves transmitted from a plurality of GPS satellites, computes the absolute position and the bearing of the vehicle (the bearing of the vehicle is computed based on the current position of the vehicle and the position of the vehicle at one sampling time $\Delta t$ before the current time by performing three-dimensional or two-dimensional position-determining processing), and outputs them along with the position-determination time. The vehicle relative-position sensor 6 is provided with an angular sensor such as a vibration gyro for detecting the vehicle rotation angle as a relative bearing and a distance sensor for outputting one pulse per predetermined distance traveled, whereby the relative position and the bearing of the vehicle is detected.

Based on the map data output from the navigation controller 1, the display device 9 displays map information in the vicinity of the vehicle as well as a starting position mark, a destination mark, and the like, or displays guiding routes on the map.

Figure 2:
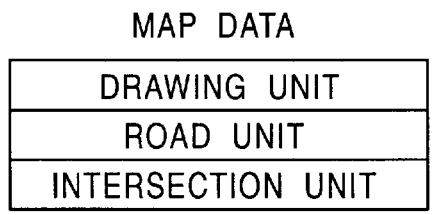
FIG. 2 is a diagram showing the contents of map data for each map sheet.

Next, the map data recorded in the DVD 2 is described in detail. The map data recorded in the DVD 2 consists of rectangular map sheets which are defined by a predetermined range of longitudes and latitudes and which are treated as a unit. Each map sheet of the map data is identified by specifying a map sheet number, whereby it can be read. FIG. 2 is a diagram showing the contents of each map sheet of the map data. As shown in FIG. 2, each map sheet of the map data includes (1) a drawing unit consisting of various data required for map displaying, (2) a road unit consisting of data required for various processing operations such as map matching, route searching, and route guidance, and (3) an intersection unit consisting of detailed data of intersections and the like.

The above-described drawing unit includes data for a background layer required for displaying buildings or rivers and data for a character string layer required for displaying the names of cities, towns, and villages, the names of roads, and the like. The above-described background layer further includes data for the heights of buildings for displaying the buildings in the vicinity of an intersection in a three-dimensional manner. The data for the heights of the buildings may be represented in meters or the like, or may be represented by the number of the floors thereof. When the height is represented by the number of the floors of the building, a conversion equation, such as the height of one floor=3 meters, is provided. When an actual computation is performed, the height of the building may be computed in accordance with the number of floors.

Figure 3:
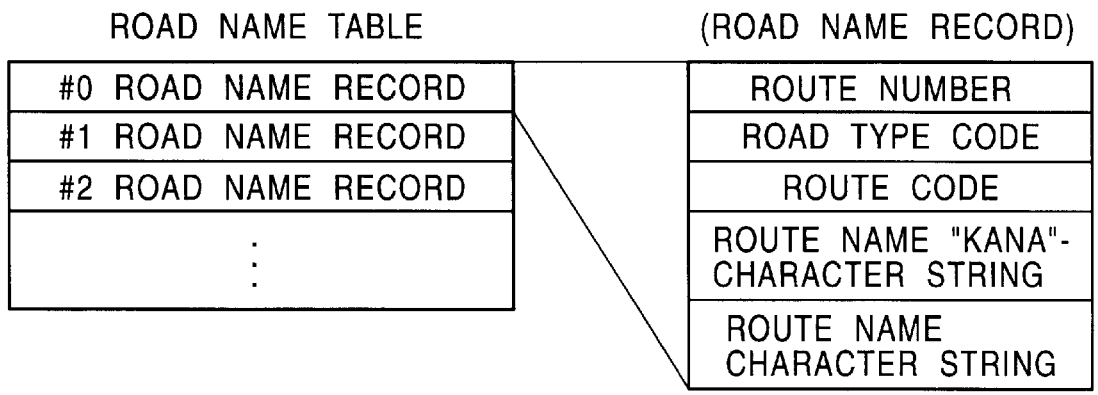
FIG. 3 is a diagram showing the detailed contents of a road name table included in a character layer of a drawing unit.

FIG. 3 is a diagram showing the detailed contents of a road name table included in the character string layer of the drawing unit. As shown in FIG. 3, the road name table includes a road name record for each road contained in the map sheet of interest. Each road name record includes:

(a) a route number;

(b) a road type code representing the type (an expressway, a city expressway, a national highway or the like) of this road;

(c) a route code corresponding to the route number of the national highway, a prefectural highway, or the like;

(d) a route name "kana" (Japanese phonetic syllabary)-character string; and (e) a route name character string.

Figure 4:
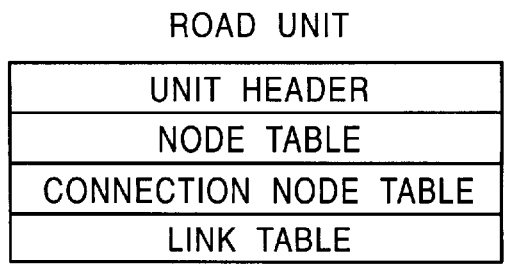
FIG. 4 is a diagram showing the various tables in a road unit.

In the road unit shown in FIG. 2, a line connecting between an intersection of a road and another intersection in its vicinity is called a link, and an intersection to which more than one link is connected is called a node. FIG. 4 is a diagram showing the various tables included in the road unit. As shown in FIG. 4, the road unit includes a unit header for identifying the road unit, a connection node table for storing detailed data of the entirety of the nodes, a node table for showing the storage location of the connection node table, and a link table storing the detailed data of the link specified by two neighboring nodes.

FIGS. 5A to 5C are diagrams showing the detailed contents of the various tables included in the road unit. As shown in FIG. 5A, the node table has node record #0, node record #1, etc. which correspond to all nodes included in the map sheet of interest. A node number is sequentially assigned, starting from #0, to each node record in accordance with the layout. Each node record represents the storage location of the connection node table corresponding to each node.

As shown in FIG. 5B, the connection node table includes, for each of the existing nodes:

(a) the normalized longitude and normalized latitude;

(b) "node attribute flags" including an intersection node flag representing whether this node is an intersection node, a neighboring node flag representing whether the node is located at the boundary with another map sheet, and branching information representing whether another link is branched at this node, and, if it is branched, whether the shape of branching links corresponds to a 'T' or a 'Y' shape;

(c) "number of connecting nodes" representing, when there are links having this node as ends thereof, the number of the nodes which constitute the other ends thereof;

(d) "number of traffic controls" when links connected to this node have traffic controls such as "no U-turn" or "no right-turn";

(e) connection node records, having the same number as the number of links, each of which represents the link number of each link having this node as one node thereof;

(f) traffic control records, when the above-described traffic control exists, representing the detailed contents of the traffic controls in accordance with the number of traffic controls;

(g) "neighboring node record", when this node is located at the boundary with another map sheet, representing the location of the connection node table of the node on the neighboring map sheet corresponding to this node; and (h) the storage location and the size of the corresponding intersection record in the intersection unit when this node is an intersection node.

As shown in FIG. 5C, the link table includes a plurality of link records, sorted in the order of the link number, corresponding to all links included in the map sheet of interest. Each link record includes:

(a) the link ID which is a code attributed to each link chiefly for route-search display;

(b) node number 1 and node number 2 for specifying two nodes at both ends of the link;

(c) the distance of the link;

(d) cost required for traveling via this link;

(e) various road attribute flags including road attribute information (the presence or the absence of one-way traffic and the like) attached to this link;

(f) a road type flag representing whether the road type of the actual road corresponding to this link is an express highway or a general road and representing the width of the road in meters; and (g) the route number assigned to the road corresponding to this link.

FIG. 6 is a diagram showing the detailed contents of the intersection unit. As shown in FIG. 6, the intersection unit includes, for each intersection, a unit ID code, an intersection record having information on the intersection itself, an intersection direction information record having information on the destination and the like of the road extending from the intersection, and an intersection lane information record having data on each lane of the roads constituting the intersection.

As shown in FIG. 7, each intersection record corresponds to each of the existing intersections, and includes:

(a) "intersection information flag" including a signal flag representing whether a traffic light exists at this intersection;

(b) "number of crossing roads" showing the number of crossings of this intersection;

(c) the display coordinates of the intersection name when the intersection name is displayed;

(d) the intersection name character string to be displayed; and (e) the link ID of each of the links constituting this intersection and the storage locations (having the same number as the number of crossings of the intersection) of the intersection direction information records corresponding to this link.

Next, the detailed construction of the navigation controller 1 shown in FIG. 1 is described. The navigation controller I is provided with a data buffer 16 for displaying a guiding image for a predetermined map image or an intersection, an auxiliary image showing the positional relationship between the guiding image and the intersection, or the like, a map reading control unit 18, a map-drawing unit 20, a VRAM (Video Random Access Memory) 22, an image synthesis unit 26, an intersection guiding image drawing unit 46, an auxiliary-image drawing unit 48, a vehicle position computing unit 30 for performing computation of the position of the vehicle, map-matching processing, route-search processing, route-guiding processing, as well as for outputting the results of these, a route-search processing unit 36, a guiding-route drawing unit 42, a remote control unit 60 for causing various operation screens for a user to be displayed or causing operation instructions from the remote control unit 4 to be sent to each unit, a cursor-position computing unit 62, and an operation screen generating unit 64.

The data buffer 16 is provided for temporarily storing map data read by the disk reading device 3 from the DVD 2. When the vehicle position computing unit 30 computes the position of the vehicle, the map reading control unit 18 reads from the DVD 2 map data required for map display by sending a read request for a predetermined range of map data including the position of the vehicle to the disk read device 3, and stores the map data in the data buffer 16.

The map-drawing unit 20 creates map image data to display the vicinity of the vehicle in a three-dimensional manner based on the map data stored in the data buffer 16. The map image data according to the present embodiment is created based on a viewpoint which is set in accordance with a case in which a user sits in the driver's seat of the vehicle in a predetermined posture and looks ahead. Because of this, a map image created by the map-drawing unit 20 and displayed by the display device 9 that is a view observed from the driver's seat is realized in a virtual manner. An actual example of the display is described hereinafter.

Here, in the above-described map-drawing unit 20, one example of a specific method for creating the map image data in order to perform three-dimensional display is described. Initially, two-dimensional map data representing planar shapes such as building or roads included in the background layer undergoes a rotation coordinate-transformation in accordance with the traveling direction of the vehicle. Next, a bird's eye view (referred to as "bird's eye view A") is created by performing a predetermined projection transformation processing on the transformed two-dimensional map data based on the view position in which the direction of view is set to be along the traveling direction of the vehicle and the position thereof is set to be the position of the vehicle (the driver's seat).

After translating the two-dimensional map data in the direction of the height based on height data included in the background layer, a bird's eye view (referred to as "bird's eye view B") is created by performing a predetermined projection transformation processing based on the position of the view. The above-described bird's eye view A corresponds to the planar shape of the lower part of buildings and the like, and the bird's eye view B corresponds to the planar shape of the upper part of buildings and the like. Therefore, by connecting the vertices in the bird's eye view A and the corresponding vertices in the bird's eye view B, a three-dimensional image of the buildings and the like are obtained. By overwriting, to the VRAM 22, the three-dimensional image obtained in this manner in order of decreasing distance from the position of the view, the map image data displayed in a three-dimensional manner can be obtained.

The map image data created by the map drawing unit 20 is stored in the VRAM 22 and then is read by the image synthesis unit 26. The image synthesis unit 26 performs image synthesis by superposing the map image data read from the VRAM 22 and image data output from each of the intersection guiding-image drawing unit 46, the auxiliary-image drawing unit 48, and the operation-screen generating unit 64. The image which is synthesized by the image synthesis unit 26 is displayed on the screen of the display device 9.

The vehicle-position computing unit 30 computes the position of the vehicle based on the detected data from the GPS receiver 5 and the vehicle relative-position sensor 6. In addition, the vehicle-position computing unit 30 corrects the position of the vehicle by performing map-matching processing when the computed position of the vehicle is not on any of the roads on the map data. Under predetermined conditions, the route-search processing unit 36 searches for a traveling route linking between the preset destination and the starting place. For example, under various conditions such as a minimum distance condition or a minimum time condition, such a guiding route to minimize the cost is set. As a typical method for route searching, the Dijkstra method or a breadth-first search method is known. The guiding-route drawing unit 42 draws the guiding route set by the route-search processing unit 36 over the map image.

Based on the map data stored in the data buffer 16, the intersection guiding-image drawing unit 46 creates guiding image data for displaying information on intersections and the like which are within a predetermined distance from the intersection that the vehicle is expected to pass or within a predetermined distance from the position of the vehicle. In the present embodiment, traffic lights, one-way traffic signs, "DO NOT ENTER" signs, lane information, route numbers, and intersection names are considered as guiding images.

The auxiliary-image drawing unit 48 creates an auxiliary image showing which location in the map image corresponds to each of the guiding images created by the above-described intersection guiding-image drawing unit 46. To be specific, according to the present embodiment, predetermined shadows are attached to the traffic lights and the traffic signs while predetermined leader lines are attached to intersection information arranged by lane information, route number, and intersection name. The above-described shadows and the leader lines correspond to auxiliary images. An actual example of the display is described hereinafter.

The overall navigation apparatus and the navigation controller 1 have the above-described configurations. An operation procedure of guiding image and auxiliary image display for the corresponding intersection, which are performed in parallel with map image display in the vicinity of the vehicle, is now described. Here, for simplification of the description, a case is described in which no route guiding is performed.

Figure 8:
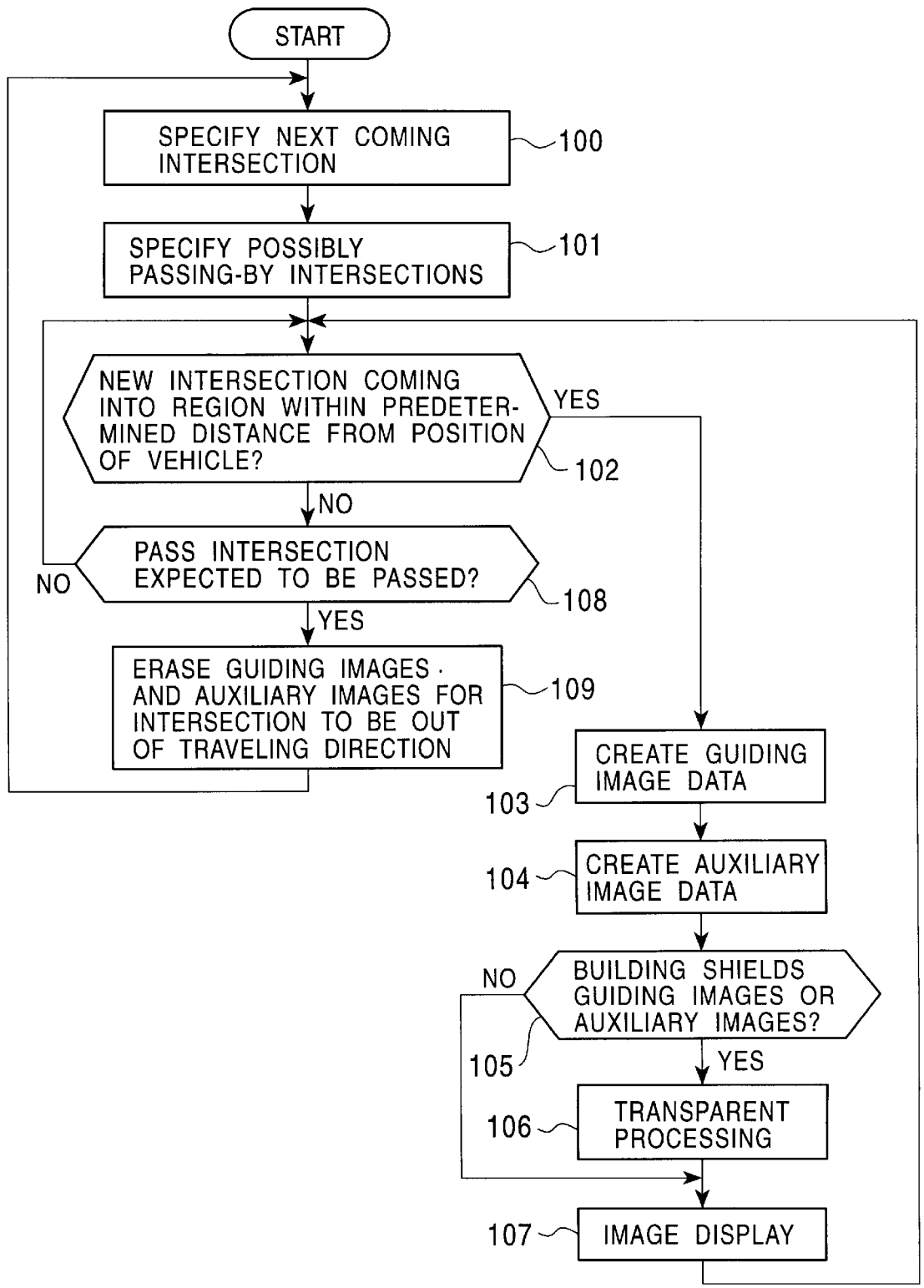
FIG. 8 is a flow chart showing an operation procedure of the navigation apparatus when guiding and auxiliary images for an intersection are displayed.

FIG. 8 is a flow chart showing the operation procedure of the navigation apparatus when the guiding image and the auxiliary image for the corresponding intersection are displayed. The intersection guiding-image drawing unit 46 specifies the intersection (hereinafter, referred to as "intersection expected to be passed") that the vehicle is to pass next based on the current position and the traveling direction of the vehicle as computed by the vehicle-position computing unit 30 and the map data stored in the data buffer 16 (step 100). Next, from among the intersections in the vicinity (hereinafter, referred to as "neighboring intersections") of the intersection expected to be passed, the intersection guiding-image drawing unit 46 specifies the neighboring intersection that the vehicle will possibly pass (step 101). To be specific, when an intersection node expected to be passed is NO and intersection nodes corresponding to the neighboring intersections extracted in processing at step 101 are N1, N2, N3, and N4, the intersections that the vehicle will possibly pass can be specified by checking the road attribute flags (see FIG. 5C) corresponding to the links connected between the node NO and nodes N1, N2, N3, and N4.

Next, the intersection guiding-image drawing unit 46 determines whether intersections newly come into a region within a predetermined distance from the position of the vehicle (step 102). For example, when the above-described predetermined distance is set to be 300 m from the position of the vehicle, the intersection guiding-image drawing unit 46 computes, based on the map data stored in the data buffer 16, the distances from the position of the vehicle (computed by the vehicle-position computing unit 30) to each of the intersections and then determines whether there is any intersection whose computed distance is within 300 m. When any intersection comes into the region within the predetermined distance from the position of the vehicle, the intersection guiding-image drawing unit 46 reads intersection information corresponding to this intersection from the map data stored in the data buffer 16 (step 103).

As described above, in the present embodiment, traffic lights, one-way signs, "DO NOT ENTER" signs, lane information, route numbers, and intersection names are considered as intersection information. Among the information used for creating guiding images, information on the presence or the absence of traffic lights, or the intersection name can be obtained from the above-described intersection record shown in FIG. 7 while information on each of lane information, route number, and one-way traffic can be obtained from link records shown in the above-described FIG. 5C. As to "DO NOT ENTER", it can be determined by obtaining one-way traffic information from the above-described link records and checking the directions of the one-way traffic roads from the obtained information. That is, in a case in which, among a plurality of links connected to a node A, there is a link B in which only entry in the direction of the node A can be allowed, it is possible to determine that entry from the node A to the link B is prohibited. In this case, a guiding image representing "DO NOT ENTER" should be displayed in the vicinity of a meeting point between the intersection image corresponding to the node A and the road image corresponding to the link B.

When the guiding image data is created, the auxiliary-image drawing unit 48 creates auxiliary image data corresponding to each guiding image data (step 104). An actual example of the display of the auxiliary image is described hereinafter. When the guiding image data and the auxiliary image data, which correspond to each intersection coming into the region within the predetermined distance from the position of the vehicle, are created, the map-drawing unit 20 determines whether map images of buildings and the like are located in a position to block guiding images and auxiliary images when observed from the viewing position set in the position of the vehicle (step 105).

When there are buildings or the like which block the guiding images and the auxiliary images, the map drawing unit 20 creates the map image data by applying transparent processing to these buildings and the like (step 106). To be specific, by checking the coordinates of the map image data created on its own, the coordinates of the guiding image data created by the intersection guiding image drawing unit 46, and the coordinates of the auxiliary image data created by the auxiliary image drawing unit 48, the map-drawing unit 20 obtains positional relationships among each of the images as observed from the viewing position. The map-drawing unit 20 determines whether transparent processing needs to be applied to the buildings and the like in accordance with this result. As to the buildings which need transparent processing applied thereto, the map image data is created so that frames are drawn and corresponding side faces are filled. When there is no building or the like blocking the guiding images or the auxiliary images, a negative determination result occurs in the processing at step 105. In this case, the above-described transparent processing is not performed.

The guiding image data and the auxiliary image data created due to the above-described processing as well as the map image data created by the map drawing unit 20 are synthesized by the image synthesis unit 26. The image based on this synthesized image data is displayed on the display device 9 (step 107). When image display is performed, the process proceeds back to step 102 in which operations from the determination of whether intersections newly come into the region within the predetermined distance from the position of the vehicle repeat.

In the above-described processing at step 102, in a case in which there are two or more intersections coming into the region within the predetermined distance from the position of the vehicle, the intersection guiding image drawing unit 46 according to the present embodiment creates guiding image data having display areas different from one another in accordance with the importance of each intersection. To be specific, according to the present embodiment, the importance of each intersection is determined in accordance with the distance from the position of the vehicle to the intersection. The display area of the guiding image corresponding to the intersection having greater importance becomes larger. By thus varying the display area of the corresponding guiding image in accordance with the importance of each intersection, the importance of each guiding image can be easily recognized visually.

In the map-drawing unit 20 according to the present embodiment, when the map image data is created, the map image data is created so that the buildings and the like within the predetermined distance from the position of the vehicle are not displayed in a three-dimensional manner. Therefore, according to the navigation apparatus of the present embodiment, a map image can be displayed which is similar to the view the user actually observes from the driver's seat, and, moreover, which enables the appearance of the intersection that the vehicle is to pass hereafter to be easily recognized. An actual example of the display of these map images is described hereinafter.

In the above-described processing at step 102, in a case in which no intersection is determined to come into the region within the predetermined distance from the position of the vehicle (a negative determination is made at step 102), the intersection guiding image drawing unit 46 determines, based on the position of the vehicle computed by the vehicle-position computing unit 30, whether the vehicle has passed the intersection expected to be passed (step 108). In a case in which the vehicle has not yet passed the intersection expected to be passed, the process proceeds back to the processing at step 102. Processing then repeats from the determination of whether any intersection comes into the region within the predetermined distance from the position of the vehicle.

In a case in which the vehicle has passed the intersection expected to be passed, an affirmative determination is made in processing at step 108. The intersection guiding image drawing unit 46 and the auxiliary-image drawing unit 48 instruct the map image drawing unit 20 to erase the guiding images and the auxiliary images which are out of the traveling direction (step 109). To be specific, the intersections out of the traveling direction can be determined by checking, from among the neighboring intersections specified in the above described processing at step 101, the intersections included in roads other than the road which the vehicle travels along after passing the intersection expected to be passed (the road which the vehicle currently travels along). Based on this determination, the intersection guiding-image drawing unit 46 creates only the guiding image data corresponding to the other intersections, excluding the guiding images corresponding to the extracted intersections out of the traveling direction. The guiding image data is output to the map-drawing unit 20 and the auxiliary-image drawing unit 48. Since the auxiliary-image drawing unit 48 creates the auxiliary image data corresponding to the guiding image data output from the intersection guiding-image drawing unit 46, the auxiliary image data that is created does not include the auxiliary images corresponding to the guiding images of the intersections out of the traveling direction. Therefore, the guiding image data, the auxiliary image data, and the map image data created by the map-drawing unit 20 are synthesized, and, by performing display based on this synthesized image data, a map image is displayed in which the guiding images and the auxiliary images corresponding to the intersections off the traveling direction are erased. After the map image is displayed, the process proceeds back to step 100, and processing repeats from the operation of specifying the next intersection expected to be passed.

Figure 9:
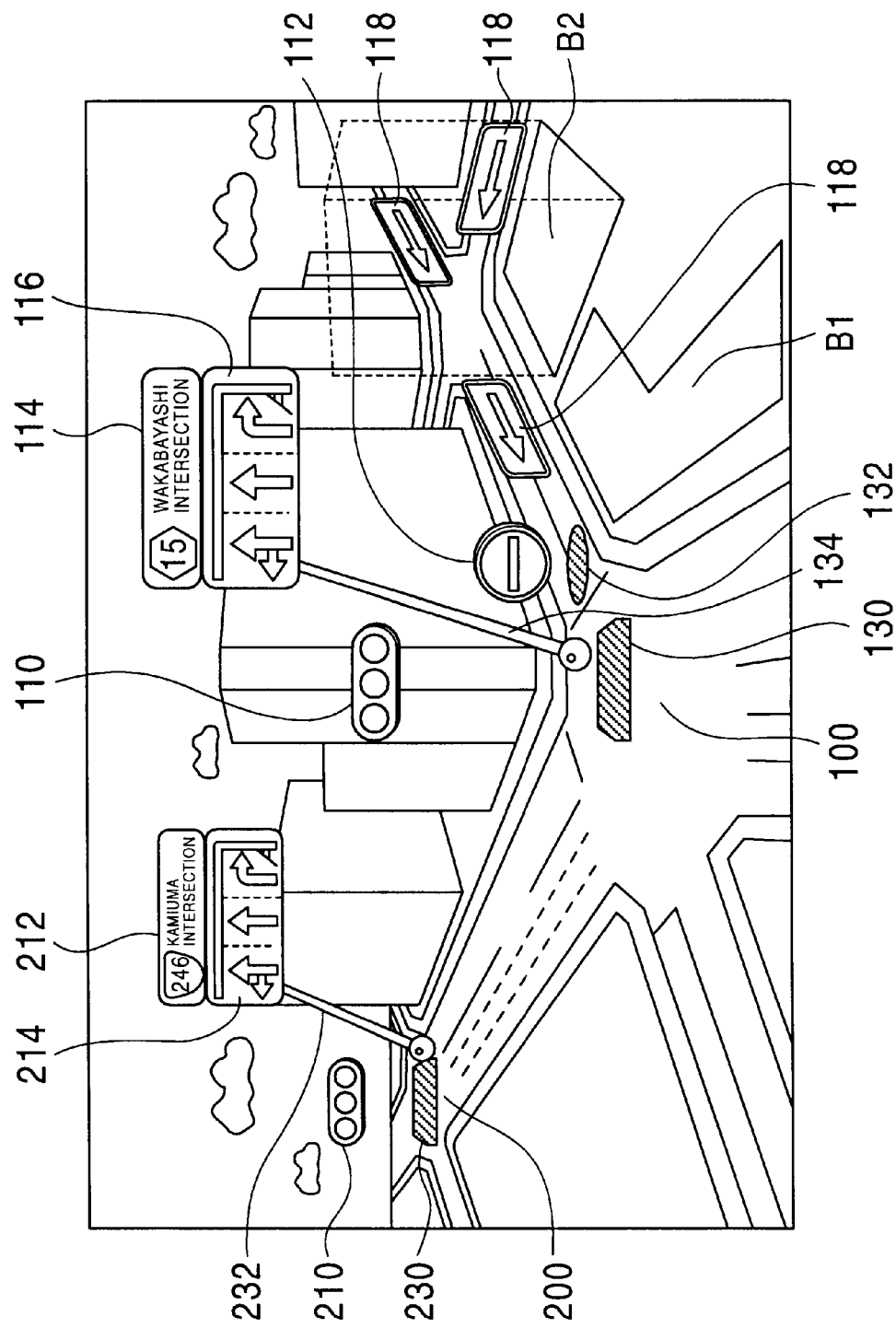
FIG. 9 is an illustration showing one example of the intersection guiding image displayed on the navigation apparatus according to the present embodiment of the invention.

FIG. 9 shows one example of intersection guiding-images shown on the navigation apparatus according to the present embodiment. In FIG. 9, the appearance in which the guiding images and the auxiliary images are displayed on the map image created by setting the viewpoint at the position of the vehicle (driver's seat) is described. In FIG. 9, guiding images 110, 112, 114, 116, and 118 are guiding images that correspond to an intersection 100 in which the guiding image 110 represents the traffic light, the guiding image 112 represents the "DO NOT ENTER" sign, the guiding image 114 represents the route number and the intersection name, the guiding image 116 represents the lane information, and the guiding image 118 represents the one-way traffic sign. Guiding images 210, 212, and 214 are guiding images that correspond to an intersection 200 in which the guiding image 210 represents the traffic light, the guiding image 212 represents the route number and the intersection name, and the guiding image 214 represents lane information. In FIG. 9, when the intersection 100 corresponds to the above-described intersection expected to be passed and the intersection 200 corresponds to the next intersection, each guiding image corresponding to the intersection 100 is displayed in size larger than each guiding image corresponding to the intersection 200. Thus, by varying the display area of each of the corresponding guiding images in accordance with the importance of each intersection, the importance of each guiding image can be easily recognized visually. B1 shown in FIG. 9 represents an example building within the predetermined distance from the above-described position of the vehicle in which the map image data for three-dimensional display is not created and only map image data representing the bottom face of the building is displayed. By thus causing the building and the like within the predetermined distance from the position of the vehicle not to be displayed in a three-dimensional manner, the appearance of the intersection 100 is shown as an easily recognizable map image.

In FIG. 9, auxiliary images 130, 132, and 134 correspond to guiding images of the intersection 100, and auxiliary images 230 and 232 correspond to guiding images of the intersection 200. A description is made focusing on the intersection 100. The auxiliary image 130 corresponds to the guiding image 110 (traffic light) and the auxiliary image 132 corresponds to the guiding image 112 (one-way traffic sign). In a virtual three-dimensional space realized by the map image, these auxiliary images 130 and 132 are provided on the corresponding roads right beneath the guiding images 110 and 112, respectively, and they represent artificial shadows which are created when light is irradiated toward these guiding images from above. By creating such auxiliary images 130 and 132, it becomes easy to visually recognize that each of the guiding images 110 and 112 correspond to the intersection 100. The auxiliary image 134 corresponds to the guiding image 114 (the route number and the intersection name) and the guiding image 116 (lane information). In the three-dimensional space virtually realized by the map image, it represents a cylindrical leader line extending in the direction of the guiding images 114 and 116 from a predetermined position in the intersection 100. By creating such an auxiliary image 134, it becomes easy to recognize that each of the guiding images 114 and 116 correspond to the intersection 100.

Likewise, in FIG. 9, a description is made focusing on the intersection 200. The auxiliary image 230 represents an artificial shadow which is created so as to correspond to the guiding image 210 (traffic light). The auxiliary image 232 represents a cylindrical leader line which is created so as to correspond to the guiding image 212 (route number and intersection name) and the guiding image 214 (lane information). By creating these auxiliary images 230 and 232, it becomes easy to visually recognize that each of the guiding images 210, 212, and 214 are created corresponding to the intersection 200.

In FIG. 9, a building B2 which is located in such a position so as to block the guiding image 118 (one-way traffic) has transparent processing applied thereto so that side faces of the building are not filled and only frames thereof are left. In FIG. 9, in order to make the appearance of the building B2 which has undergone transparent processing easy to recognize, the frames corresponding to the building B2 are represented with dashed lines. In reality, for example, the frames may be represented with straight lines of gray color or the like, or may be represented with lines which are thinner than the frames of other buildings. Alternatively, the side faces of the building may be semi-transparent so that the guiding image 118 which is behind the building can be observed through it. By applying transparent processing in this manner, the guiding image 118 which would be hidden by the building B2 when observed from the viewpoint becomes artificially observed through the building B2. In the above-described example, although the case in which the auxiliary image is not blocked is described, in a case in which the auxiliary image is also blocked, transparent processing should be performed by applying the same processing as is applied to the guiding image in the above-described manner.

When the navigation apparatus according to the present embodiment displays guiding images of the intersection that the vehicle is expected to pass next and guiding images of its neighboring intersections, since a predetermined auxiliary image corresponding to each of the guiding images is created and displayed, the driver can easily recognize the relationships between each guiding image and each intersection on the map image. In particular, in the present embodiment, since a predetermined order of priority is set for each guiding image, and the display areas of the guiding images are varied in accordance with the priority order, the importance of each guiding image can be easily visually recognized. By applying transparent processing to the buildings and the like which are located in such a position to block the guiding images when observed from the position of the viewpoint, the positional relationship between the guiding images and the map images can be easily recognized. Also, since the map images of the buildings and the like within the predetermined distance from the position of the vehicle are not allowed to be displayed, there is an advantage in that the appearances of the intersections which the vehicle is to pass hereafter can be easily recognized.

The present invention is not limited to the above-described embodiment and various changes may be made within the spirit and the scope of the invention. For example, in the above-described embodiment, when the map image is created, the viewing position is set in the position of the vehicle (the driver seat). However, the viewing position is not necessarily limited to this. For example, the viewing position may be set above the position of the vehicle. In the above-described embodiment, other than guiding images for the intersections the vehicle is expected to pass hereafter (intersections expected to be passed), one intersection is extracted for each traveling road from among the intersections which the vehicle will possibly pass and which are the closest to the intersections to be passed. However, the number of extracted intersections is not necessarily limited to one and the guiding images may be arranged to be created by extracting two or more intersections. In this case, an order of priority is assigned to each extracted intersection in accordance with the distance from the intersection expected to be passed to each intersection, and the display areas of the corresponding guiding display images as to each intersection should be arranged to be varied.

Figure 10:
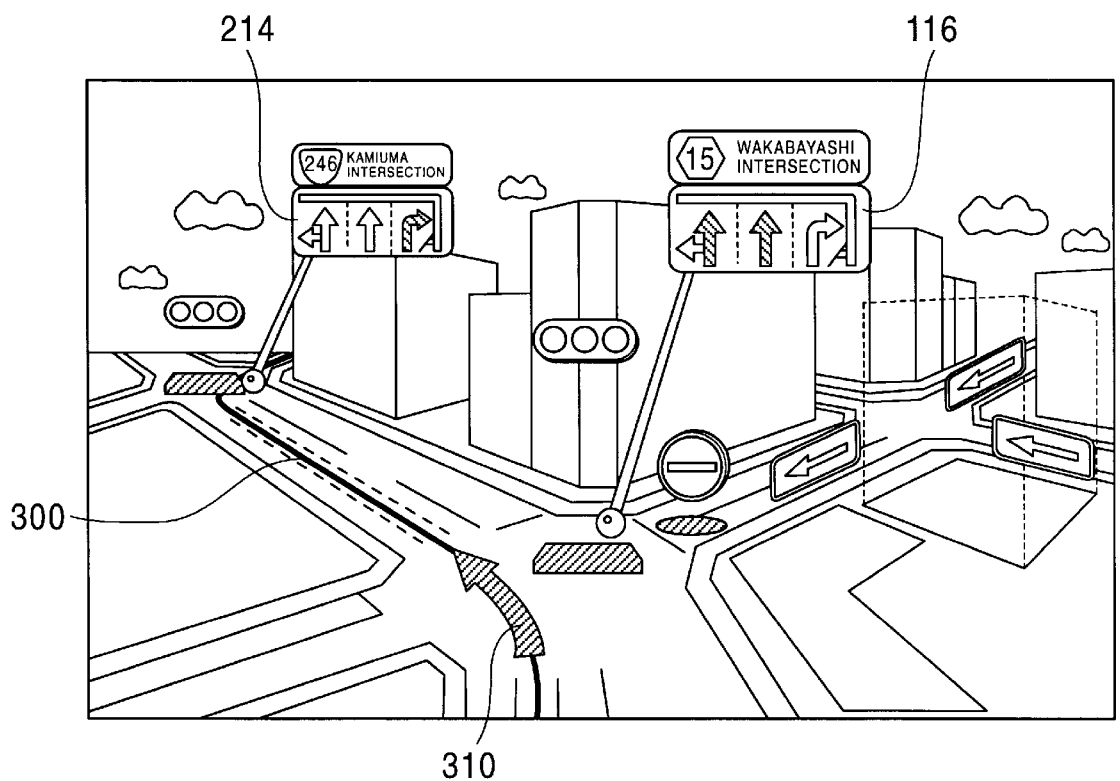
FIG. 10 is an illustration showing a sample display in a case in which route guiding is performed.
Figure 11A:
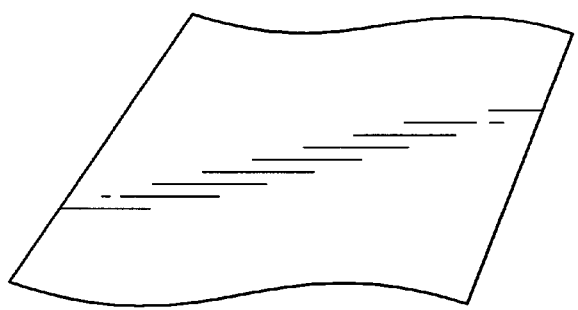
FIGS. 11A to 11D are illustrations showing one example in which the guiding image gradually floats.
Figure 11B:
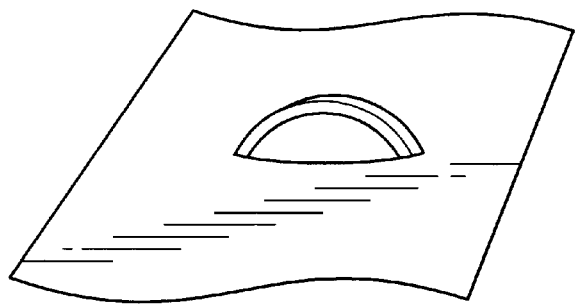
Figure 11C:
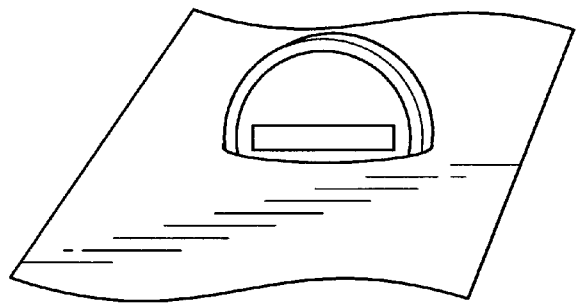
Figure 11D:
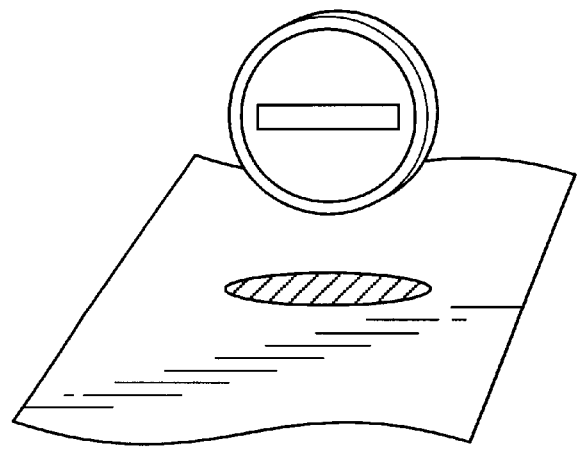

In the above-described embodiment, the case is described in which the map image in the vicinity of the vehicle is displayed without applying route guiding. However, the present invention can be also applied to a case in which route guiding is applied. FIG. 10 is an illustration showing an example display when the route guiding is performed. As shown in FIG. 10, when the route guiding is applied, processing should be performed so that a guiding route image 300 is further superimposed onto the road corresponding to the guiding route, an arrow image 310 representing the traveling direction of the vehicle is superimposed onto the intersection, and the lanes (the straight lane in the middle of the guiding image 116 and the right-turn lane in the right side of the guiding image 214) are filled with a noticeable color in accordance with lane information indicated by the guiding images 116 and 214 (lane guidance).

When route guiding is performed, since the intersections the vehicle is expected to pass are predetermined, instead of the above-described extracting processing of the nearest intersections executed from steps S101 to S103 in FIG. 8, the intersection guiding images may be created by obtaining intersection information corresponding to the intersections expected to be passed in order. In this case, since there is no need to display the intersections which the vehicle is not expected to pass and so which do not require guiding image display, a complicated display can be avoided, which leads to visual neatness. In addition, the process of extracting the intersections at which guiding images are displayed can be simplified.

In the above-described embodiment, the display areas of guiding images are varied in accordance with the order of priority of each intersection. By varying the colors of the guiding images, important guiding images may be arranged so as to be visually recognized.

When the above-described guiding images are displayed, each guiding image may be displayed so as to gradually float from roads in the vicinity of the intersection corresponding thereto (roads realized on the map image). FIGS. 11A to 11D are illustrations showing one example of a display in which a guiding image gradually floats. In the figure, there are shown illustrations in which the "DO NOT ENTER" sign gradually floats. As shown in FIGS. 11A to 11D, the one-way traffic sign on the road of the map image is displayed so as to gradually reveal its appearance from under the road, and, finally, the sign is shown where it is supposed to be shown. By thus causing the guiding image display to be animated, the intersection to which the guiding image ("DO NOT ENTER" sign in FIGS. 11A to 11D) corresponds can be more easily recognized.

Figure 12:
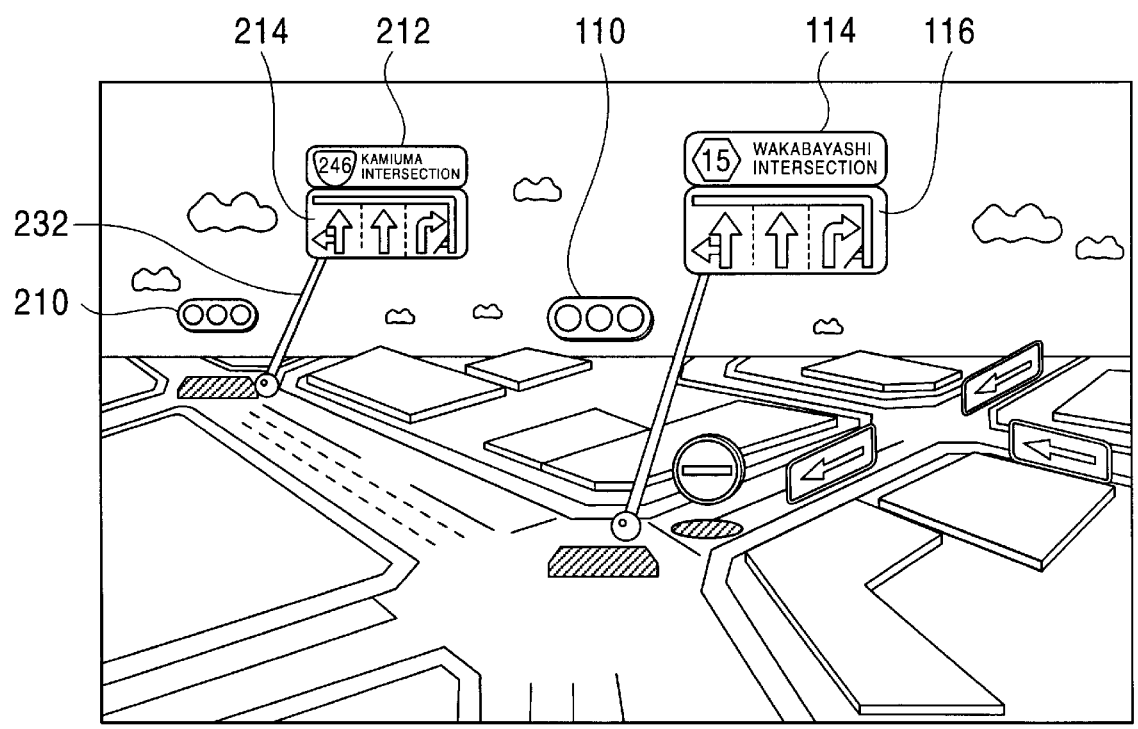
FIG. 12 is an illustration showing one example of a case in which the guiding images corresponding to each intersection are displayed superimposed one after another in a region corresponding to the sky.

In a case in which the map image which is created by the above-described map-drawing unit 20 includes a region corresponding to the sky, it is desirable to have the guiding images corresponding to each intersection displayed superimposed one after another in the region corresponding to the sky. FIG. 12 is an illustration showing one example of the case in which the guiding images corresponding to each intersection are displayed superimposed one after another in the region corresponding to the sky. Each of the guiding images 110, 114, 116, 210, 212, and 214 is displayed superimposed one after another in the region corresponding to the sky. Generally, in the map image created based on a viewing position set at the position of the vehicle, when the image which is similar to the view that the user actually observes is to be created, the proportion of the region corresponding to the sky in the map image increases. In terms of the map image as map information, because this region corresponding to the sky gives no information to the user, it can be regarded as a wasteful region. As shown in FIG. 12, in the case in which the buildings and the like in the vicinity of roads are not displayed in a three-dimensional manner, the region corresponding to the sky increases. Therefore, as shown in FIG. 12, by displaying some of the guiding images (or the entirety of guiding images) superimposed one after another in the region corresponding to the sky, information of, for example, roads which are important can be prevented from being visually blocked. In addition, a wasteful region on the display can be effectively used.

What is claimed is:

1. A vehicle navigation apparatus comprising:

map-image creating means for creating a map image observed ahead, in the traveling direction, of a vehicle from a predetermined viewpoint;

guiding-image creating means for creating a guiding image including information on a predetermined intersection included in said map image;

auxiliary-image creating means for creating an auxiliary image showing which intersection included in said map image relates to said guiding image; and image display means for synthesizing said guiding image created by said guiding-image creating means and said auxiliary image created by said auxiliary-image creating means on said map image created by said map image creating means and for displaying the synthesized image.

2. A navigation apparatus according to claim 1, wherein said guiding image shows information on an intersection within a predetermined distance from the position of the vehicle.

3. A navigation apparatus according to claim 1, wherein said auxiliary image includes a leader line extending from said intersection to said guiding image.

4. A navigation apparatus according to claim 1, wherein said guiding image includes one of a route number, lane information, and an intersection name.

5. A navigation apparatus according to claim 1, wherein said guiding-image creating means sets the display area of said guiding image in a variable manner in accordance with the distance between a corresponding intersection and the position of the vehicle.

6. A navigation apparatus according to claim 1, wherein said guiding-image creating means sets the display color of said guiding image in a variable manner in accordance with the distance between a corresponding intersection and the position of the vehicle.

7. A navigation apparatus according to claim 1, wherein:

said map image created by said map-image creating means includes a region corresponding to the sky; and said image display means displays guiding images superimposed one after another in said region corresponding to the sky included in said map image.

8. A navigation apparatus comprising:

map-image creating means for creating map image data in which a building is displayed in a three-dimensional manner so as to look like that which a user observes ahead, in the traveling direction, of a vehicle from a predetermined viewpoint;

guiding-image creating means for creating a guiding image including information on a predetermined intersection included in said map image;

auxiliary-image creating means for creating an auxiliary image showing which intersection included in said map image relates to said guiding image; and image display means for synthesizing said guiding image created by said guiding-image creating means and said auxiliary image created by said auxiliary-image creating means on said map image created by said map image creating means and for displaying the synthesized image.

9. A navigation apparatus according to claim 8, wherein a building within a predetermined distance from the position of the vehicle shows map image data representing only the bottom face thereof.

10. A navigation apparatus according to claim 8, wherein, when a building image is located in such a position as to block said guiding image, said guiding-image creating means creates map image data in which transparent processing is applied to said building image.

11. A navigation apparatus according to claim 10, wherein said guiding image includes one of a one-way traffic sign and a no-entry sign.

12. A navigation apparatus comprising:

map-image creating means for creating a map image observed ahead, in the traveling direction, of a vehicle from a predetermined viewpoint;

guiding-image creating means for, when a guiding route is set, creating a guiding image including information on intersections along said guiding route;

auxiliary-image creating means for creating an auxiliary image showing which intersection included in said map image relates to said guiding image; and image display means for synthesizing said guiding image created by said guiding-image creating means and said auxiliary image created by said auxiliary-image creating means on said map image created by said map image creating means and for displaying the synthesized image.

13. A navigation apparatus according to claim 12, wherein, for intersections not expected to be passed, said guiding-image creating means does not display the guiding images of said intersections.

14. A navigation apparatus according to claim 12, wherein said auxiliary image includes a leader line extending from a predetermined position in said intersection to said guiding image.

15. A navigation apparatus according to claim 12, wherein said guiding image includes one of a route number, lane information, and an intersection name.

16. A navigation apparatus according to claim 12, wherein said guiding-image creating means sets the display area of said guiding image in a variable manner in accordance with the distance between a corresponding intersection and the position of the vehicle.

17. A navigation apparatus according to claim 12, wherein said guiding-image creating means sets the display color of said guiding image in a variable manner in accordance with the distance between a corresponding intersection and the position of the vehicle.

18. A navigation apparatus according to claim 12, wherein:

said map image created by said map-image creating means includes a region corresponding to the sky; and said image-display means displays guiding images superimposed one after another in said region corresponding to the sky included in said map image.

19. A navigation apparatus according to claim 12, wherein, when said guiding image is displayed, said guiding image creating means causes said guiding image to be displayed so that said guiding image gradually floats from a road in the vicinity of the intersection corresponding to said guiding image.

20. A navigation apparatus according to claim 19, wherein said guiding image includes a one-way traffic sign.

21. A method of operating a vehicle navigation apparatus comprising:

creating a map image observed in the traveling direction of a vehicle from a predetermined viewpoint;

creating at least one guiding image including guiding information about an intersection included in said map image;

creating an auxiliary image showing which intersection included in said map image relates to said guiding image; and synthesizing said map image, said guiding image, and said auxiliary image and displaying the synthesized image.

22. A method of operating a vehicle navigation apparatus according to claim 21, wherein said auxiliary image includes a leader line extending from said guiding image to its corresponding intersection.

23. A method of operating a vehicle navigation apparatus according to claim 21, wherein a guiding image is created and displayed for intersections within a predetermined distance from the position of the vehicle.

24. A method of operating a vehicle navigation apparatus according to claim 21, wherein a guiding image is created and displayed for intersections only along a guiding route for the vehicle.

25. A method of operating a vehicle navigation apparatus according to claim 21, wherein said guiding image includes at least one of a route number, lane information, and an intersection name.

26. A method of operating a vehicle navigation apparatus according to claim 21, wherein at least one of the display area and the display color of a guide image is set in a variable manner in accordance with the distance between the corresponding intersection and the position of the vehicle.

27. A method of operating a vehicle navigation apparatus according to claim 21, wherein said map image includes a region corresponding to the sky, and at least some of the guiding images are displayed in said sky region.

28. A method of operating a vehicle navigation apparatus according to claim 21, wherein said map image includes at least one building displayed in a three-dimensional manner.

29. A method of operating a vehicle navigation apparatus according to claim 28, wherein buildings within a predetermined distance from the position of the vehicle are not shown in a three-dimensional manner.

30. A method of operating a vehicle navigation apparatus according to claim 29, wherein only the bottom outline of a building within a predetermined distance from the position of the vehicle is displayed.

31. A method of operating a vehicle navigation apparatus according to claim 28, wherein when a building image is located in such a position as to block a guiding image, at least a portion of the building is rendered non-solid so that the guiding image can be seen.

32. A method of operating a vehicle navigation apparatus according to claim 21, wherein when a guiding image is displayed, the guiding image gradually floats from a road in the vicinity of the intersection corresponding to the guiding image.

* * * * *